United States Patent [19]
Iehisa

[11] Patent Number: 4,937,837
[45] Date of Patent: Jun. 26, 1990

[54] GAS LASER DEVICE

[75] Inventor: Nobuaki Iehisa, Minamitsuru, Japan

[73] Assignee: Fanuc Ltd, Minamitsuru, Japan

[21] Appl. No.: 320,299

[22] PCT Filed: Jul. 6, 1988

[86] PCT No.: PCT/JP88/00673
§ 371 Date: Feb. 22, 1989
§ 102(e) Date: Feb. 22, 1989

[87] PCT Pub. No.: WO89/00353
PCT Pub. Date: Jan. 12, 1989

[30] Foreign Application Priority Data
Jul. 7, 1987 [JP] Japan .................. 62-169297

[51] Int. Cl.$^5$ ................................. H01S 3/22
[52] U.S. Cl. ............................ 372/58; 372/59
[58] Field of Search ............... 372/58, 59, 34, 55

[56] References Cited
U.S. PATENT DOCUMENTS
4,547,885 10/1985 Allen et al. .................. 372/59

Primary Examiner—Léon Scott, Jr.
Attorney, Agent, or Firm—Staas & Halsey

[57] ABSTRACT

A gas laser device for effecting a laser oscillation while circulating a laser gas therein includes a laser gas supply unit (5), a gas supply valve (6) arranged at an outlet of the laser gas supply unit, an exhaust unit (9) for exhausting the laser gas from a discharge tube (1), a pressure sensor (7) for detecting the pressure in the discharge tube (1), and a control apparatus (10) which detects a pressure drop in the discharge tube (1) by the pressure sensor (7) and opens the gas supply valve (6) to fill the discharge tube (1) with the laser gas to a predetermined pressure level when operation of the gas laser device is stopped. Thus the pressure in the discharge tube (1) is always higher than the pressure in the gearbox (4a), to prevent the oil in the gearbox (4a) from entering the discharge tube (1).

7 Claims, 1 Drawing Sheet

GAS LASER DEVICE

TECHNICAL FIELD

The present invention relates to a gas laser device for effecting a laser oscillation while circulating a laser gas therein, and more particularly, to a gas laser device in which a discharge tube can be automatically filled with a laser gas to an atmospheric pressure level when the gas laser device is stopped.

BACKGROUND ART

To ensure a high-speed circulation of a laser gas in a gas circulation-type laser device, a Roots blower having a gearbox filled with oil is employed, and therefore, oil vapor from the gearbox tends to adhere to the optical components of a laser oscillator device. Thus the life of these components is shortened.

Therefore, during the operation of the gas laser device, gas is continuously exhausted from the gearbox filled with oil, to create a vacuum therein and thus prevent the oil from entering the discharge tube and the like in which the laser gas is circulated. On the other hand, when the operation of the gas laser device is stopped, the gearbox is filled with the laser gas to a pressure equivalent to the atmospheric pressure, to prevent oil from entering the discharge tube and the like while the device is inoperative.

The process of filling the laser gas to the atmospheric pressure level is executed manually by an operator, and therefore, problems arise in that the operator may omit the filling process or may turn off the power supply before the atmospheric pressure level is reached, with the result that the laser gas is not filled to a predetermined pressure level.

DISCLOSURE OF THE INVENTION

An object of the present invention is to provide a gas laser device which solves the above-mentioned problems and in which a discharge tube can be automatically filled with a laser gas to an atmospheric pressure level when the operation of the device is stopped.

To solve the above problems, the present invention provides a gas laser device for effecting a laser oscillation while circulating a laser gas therein, which comprises:

a laser gas supply unit;

a gas supply valve arranged at an outlet of the laser gas supply unit;

an exhaust unit for exhausting the laser gas from a discharge tube;

a pressure sensor for detecting a pressure in the discharge tube; and gas pressure control means for detecting a pressure drop in the discharge tube by the pressure sensor and opening the gas supply valve to fill the discharge tube with the laser gas to a predetermined pressure level when operation of the gas laser device is stopped.

When the gas laser device is stopped, a pressure change occurs, and this pressure change is detected by the pressure sensor. The gas pressure control means then opens the gas supply valve to supply the laser gas from the laser gas supply unit. The process of filling the laser gas is monitored continuously by the pressure sensor until the pressure in the discharge tube reaches the predetermined level, and accordingly when the operation of the gas laser device is stopped, the discharge tube and the like are automatically filled with the laser gas to the predetermined pressure level.

BEST MODE OF CARRYING OUT THE INVENTION

Figure 1:
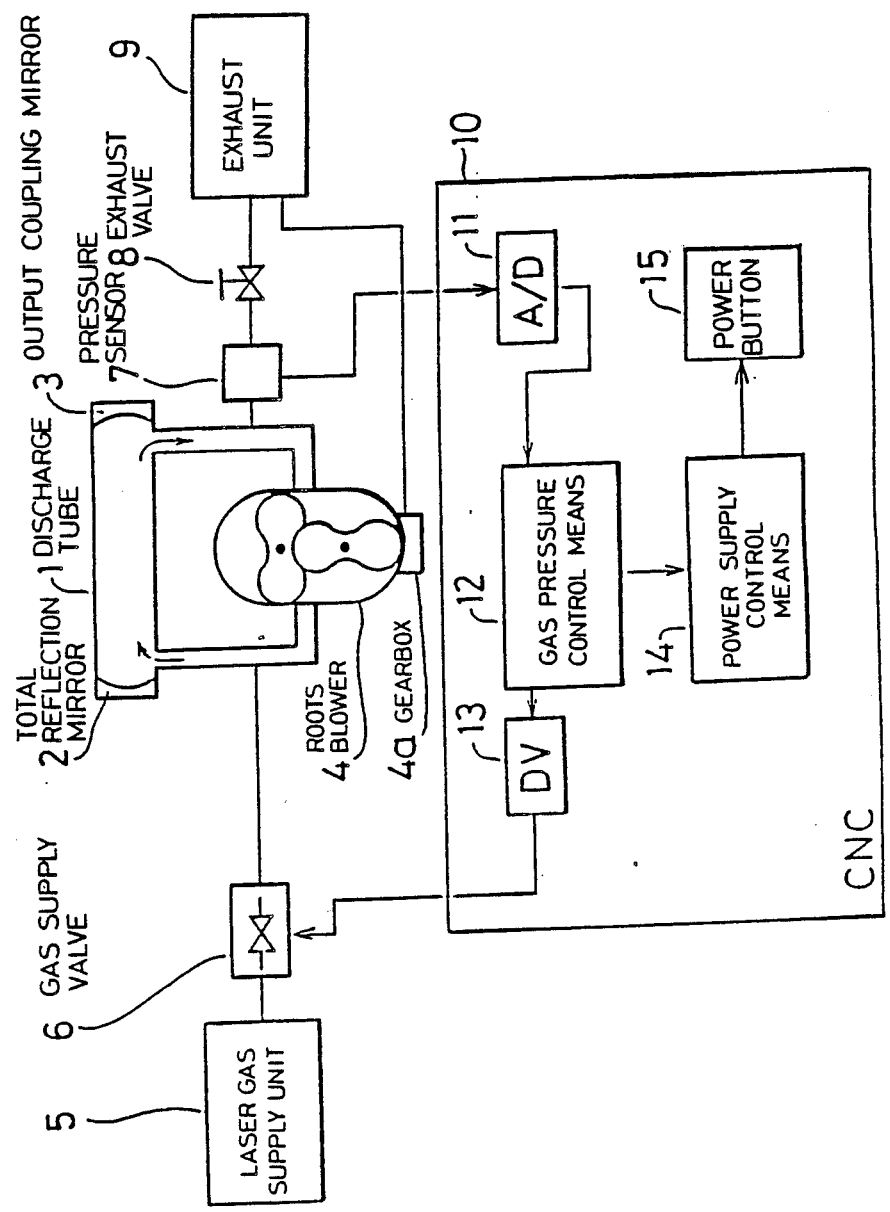
FIG. 1 is a block diagram illustrating an embodiment of the present invention.

An embodiment of the present invention will hereinafter be described with reference to the drawing.

FIG. 1 is a block diagram illustrating an embodiment of the present invention. In the figure, numeral 1 denotes a discharge tube, 2 a total reflection mirror, and 3 an output coupling mirror. Denoted at 4 is a Roots blower for circulating a laser gas. The discharge tube 1 is supplied with a voltage from a high-frequency power supply, not shown, and thus discharge pumping occurs within the discharge tube 1 and a laser beam is emitted. The Roots blower 4 includes a gearbox 4a containing gear oil therein, and to prevent the oil from flowing toward the discharge tube 1, gases in the gearbox 4a are exhausted by an exhaust unit, hereinafter described, and thus the pressure in the gearbox 4a is lower than the pressure in the discharge tube.

Numeral 5 represents a laser gas supply unit having a gas cylinder therein, 6 denotes a gas supply valve which is opened and closed by a numerical control apparatus (CNC), referred to later, 7 denotes a pressure sensor for detecting the gas pressure in the discharge tube 1, 8 denotes an exhaust valve, and 9 denotes an exhaust unit. The laser gas is fed from the laser gas supply unit 5, and since it is degraded due to electric discharge in the discharge tube 1, is exhausted by the exhaust unit 9. Therefore, after the gas laser device is operated for a certain period of time, the gas cylinder in the laser gas supply unit 5 must be replaced. Denoted at 10 is a control apparatus for controlling the gas laser device, in which a numerical control apparatus (CNC) for laser gas control is used. Numeral 11 denotes an A/D converter for converting the output of the pressure sensor 7 into a digital value.

Denoted at 12 is a gas pressure control means which, when the operation of the gas laser device is stopped, acts to fill the discharge tube 1 with the laser gas to a predetermined pressure level. Numeral 13 denotes a driver (DV) for actuating the gas supply valve 6 upon receiving a signal from the gas pressure control means. Designated at 14 is a power supply control means which prevents a stoppage of the power supply during the laser gas-filling process even if a power-off button for turning off the power supply is operated. Numeral 15 denotes a power button.

The gas pressure control means 12 carries out the following control operation: When the gas laser device is stopped, the gas pressure in the discharge tube 1 drops and this pressure drop is detected by the pressure sensor 7, and subsequently, the gas supply valve 6 is opened to fill the discharge tube 1 with the laser gas from the laser gas supply unit 5. The laser gas-filling process is monitored by the pressure sensor 7, to ensure that the pressure reaches the predetermined level. In practice, the discharge tube is filled with the laser gas to a degree such that the pressure thereof is approximately 760–1000 Torr. An excessive increase of the pressure may cause a deformation of the discharge tube 1 or the like.

If the operator presses the power-off button by mistake during the laser gas-filling process, the power supply is not cut off, since it is controlled by the power supply control means. Thus the problem wherein, in the gas laser device, the laser gas is not filled in the discharge tube 1 and the oil in the gearbox 4a enters the discharge tube and the like, does not arise. These control operations are actually effected by a PMC (programmable machine controller), not shown, which is associated with the numerical control apparatus (CNC) 10.

Accordingly, since the discharge tube is automatically filled with the laser gas when the laser device is stopped, the problem of oil in the gearbox entering the discharge tube while the laser device is inoperative does not arise.

As described above, the construction of the gas laser device of the present invention is such that, when the operation of the gas laser device is stopped, a pressure drop is detected and the discharge tube and the like are automatically filled with the laser gas from the laser gas supply unit. Accordingly, while the device is inoperative, the pressure in the discharge tube, etc., is higher than the pressure in the gearbox, whereby the oil in the gearbox is prevented from entering the discharge tube, etc., and accordingly, deterioration of the optical components is prevented.

I claim:

1. A gas laser device for effecting a laser oscillation while circulating a laser gas therein, comprising:
   a laser gas supply unit;
   a gas supply valve arranged at an outlet of said laser gas supply unit;
   a discharge tube;
   a blower for circulating laser gas in the discharge tube and having a gear box;
   an exhaust unit for exhausting laser gas from the discharge tube;
   a pressure sensor for detecting pressure in the discharge tube;
   gas pressure control means responsive to the detection of a pressure drop in the discharge tube by said pressure sensor operable to open said gas supply valve to fill the discharge tube with the laser gas to a predetermined pressure level higher than the pressure level in the gear box when operation of the gas laser device is stopped; and
   a power-off button for turning off the power supply to the gas pressure control means;
   said gas pressure control means including a power supply control means which renders said power-off button inoperative while the discharge tube is being filled to said predetermined level.

2. A gas laser device, comprising:
   a discharge tube for containing a laser gas;
   a total reflection mirror disposed at one end of said discharge tube and an output coupling mirror disposed at an opposite end of said discharge tube;
   a blower for forcibly circulating said laser gas in said discharge tube;
   an exhaust means for exhausting deteriorated laser gas from said discharge tube through an exhaust valve;
   a gas supply means for supplying fresh laser gas into said discharge tube through a gas supply valve to supplement said exhausted laser gas;
   a pressure sensor for detecting gas pressure in said discharge tube; and
   a gas pressure control means connected to said pressure sensor and to said gas supply valve, wherein said gas pressure control means opens said gas supply valve based on the pressure value detected by said pressure sensor when operation of said blower, said exhaust means and said gas laser device is stopped, and fills said discharge tube with said laser gas until the pressure in said discharge tube is substantially as high as the atmospheric pressure.

3. A gas laser device according to claim 2, wherein the pressure in said discharge tube is set to a range of 760 to 1000 Torr.

4. A gas laser device according to claim 2, which includes a power-off button for turning off a power means and wherein said gas pressure control means includes a power supply control means which renders said power-off button inoperative while the laser gas is being filled in said discharge tube.

5. A gas laser device, comprising:
   a discharge tube for containing a laser gas;
   a total reflection mirror disposed at one end of said discharge tube and an output coupling mirror disposed at an opposite end of said discharge tube;
   a blower provided with a gear box filled with oil for forcibly circulating said laser gas in said discharge tube;
   an exhaust means for exhausting deteriorated laser gas in said discharge tube through an exhaust valve and evacuating said gear box so that the pressure in said gear box is lower than that in said discharge tube;
   a gas supply means for supplying fresh laser gas into said discharge tube through a gas supply valve to supplement said exhausted laser gas;
   a pressure sensor for detecting gas pressure in said discharge tube; and
   a gas pressure control means connected to said pressure sensor and said gas supply valve, wherein said gas pressure control means opens said gas supply valve based on a pressure value detected by said pressure sensor when operation of said blower, said exhaust means and said gas laser device is stopped, and fills said discharge tube with said laser gas so that the pressure in said discharge tube is higher than that in said gear box.

6. A gas laser device according to claim 5, wherein the pressure in said discharge tube is set to a range of 760 to 1000 Torr.

7. A gas laser device according to claim 5, which includes a power-off button for turning off power means and wherein said gas pressure control means includes a power supply control means which renders said power-off button inoperative while the laser gas is being filled in said discharge tube.

* * * * *